US009070107B2

(12) United States Patent
Klemenz

(10) Patent No.: US 9,070,107 B2
(45) Date of Patent: Jun. 30, 2015

(54) MODELING INFRASTRUCTURE FOR INTERNAL COMMUNICATION BETWEEN BUSINESS OBJECTS

(75) Inventor: Oliver Klemenz, Heidelberg (DE)

(73) Assignee: SAP SE, Walldorf (DE)

( * ) Notice: Subject to any disclaimer, the term of this patent is extended or adjusted under 35 U.S.C. 154(b) by 472 days.

(21) Appl. No.: 13/298,940

(22) Filed: Nov. 17, 2011

(65) Prior Publication Data

US 2013/0132975 A1     May 23, 2013

(51) Int. Cl.
*G06F 3/00*    (2006.01)
*G06F 9/44*    (2006.01)
*G06F 9/46*    (2006.01)
*G06F 13/00*   (2006.01)
*G06Q 10/10*   (2012.01)
*G06Q 10/06*   (2012.01)

(52) U.S. Cl.
CPC .............. *G06Q 10/10* (2013.01); *G06Q 10/06* (2013.01)

(58) Field of Classification Search
CPC ........................................................ G06Q 10/10
USPC ........................................................... 719/316
See application file for complete search history.

(56) References Cited

U.S. PATENT DOCUMENTS

| 6,738,975 B1 * | 5/2004 | Yee et al. ...................... 719/310 |
| 2001/0014890 A1 * | 8/2001 | Liu et al. ...................... 707/102 |
| 2004/0006550 A1 * | 1/2004 | Upton ................................ 707/1 |
| 2005/0216282 A1 * | 9/2005 | Chen et al. ........................ 705/1 |
| 2006/0101474 A1 * | 5/2006 | Magown ...................... 719/315 |

\* cited by examiner

*Primary Examiner* — Timothy A Mudrick
(74) *Attorney, Agent, or Firm* — Fountainhead Law Group PC

(57) ABSTRACT

Disclosed is an architecture that allows business objects to communicate across deployment unit boundaries. A runtime object may be defined to listen for a trigger event in an offering business object. The runtime object then assemble and communicate a message for processing by a consuming business object. User interfaces allow a user to configure a service integration definition to generate the runtime object.

18 Claims, 20 Drawing Sheets

```
import AP.Common.GDT;

businessobject PDIBonusEntitlement {
    [AlternativeKey]
    element ID : BusinessTransactionDocumetID;
    // MC1723
    element EmployeeID : EmployeeID;
    // 00300571
    element EmployeeUUID : UUID;
    // 00300571
    element WorkAgreementID : WorkAgreementID;
    // 00300571
    element WorkAgreementUUID : WorkAgreementUUID;
    // MONATSLOHN or GEHALTAT
    element CompensationComponentID : CompensationComponentTypeID;
    element ValidityPeriodID : CLOSED_DatePeriod;
    element Amount : LARGE_Amount;
    element ActiveIndicator : Indicator;
}
```

MODELING INFRASTRUCTURE FOR INTERNAL COMMUNICATION BETWEEN BUSINESS OBJECTS

CROSS-REFERENCE TO RELATED APPLICATION

This application relates to commonly owned co-pending U.S. application Ser. No. 13/194,263, filed Jul. 29, 2011 and is incorporated herein by reference in its entirety for all purposes.

BACKGROUND

The present invention relates to business objects in a business enterprise, and in particular to supporting communication among business objects.

Unless otherwise indicated herein, the approaches described in this section are not prior art to the claims in this application and are not admitted to be prior art by inclusion in this section.

A business enterprise typically requires numerous business functions in order to operate. An application platform provides the underlying hardware and/or software technology to support business applications and business objects operated on by the business applications in order to support the necessary business functions of the enterprise. A business object is commonly understood to be a data construct in an object-oriented programming paradigm. A business object corresponds to various aspect of business enterprise including tangible things, abstract ideas, and so on. For example, a production line for manufacturing widgets may be modeled and represented with a business object. Operations in a customer service center may be represented with a business model, and so. Operations, manipulations, and general management of business objects are commonly performed by business applications. Depending on the business application, there may be many business objects managed by that business application.

Business applications and business objects may be developed by a provider of the application platform. For example, the assignee of the instant application is a provider of a business management solution referred to generally as the Business ByDesign® software solution. Typically, the business applications and business objects are developed as a joint development effort between the platform provider and the business (also referred to as Partners). Thus, for instance, a customer relations management (CRM) system may be developed and deployed on the application platform as one "deployment unit." Another system, for example a human resources management system (HCM, for human capital management), may be deployed on the application platform as another deployment unit. A "deployment unit" therefore represents the business application(s) and business objects that are developed in order to manage a particular aspect of the business.

In order to enable Partners to create added value on top of the business applications and business objects developed by the platform provider, integration of new functionality with existing business applications and business objects is an important capability. If the Partner developed add-on is local to a deployment unit, then integration of the add-on with existing business objects in the deployment unit can be easily provided. For example, local calls within the deployment unit provide for communication between the add-on and a local business object.

However, there may be instances when it is desirable to integrate across deployment units. For instance, suppose customer performance is managed in a CRM system in one deployment unit. Suppose further that a salesman's bonus is tied to customer performance. The salesman's compensation (a human resource function provided by an HCM system in another deployment unit) may need information from the CRM system. Local calls are not available between deployment units, and integration across deployment units may require low-level access to system utilities that are not available to the Partner. The platform provider must become involved in order to support such cross deployment unit capability.

SUMMARY

In embodiments, a method for exchanging information between a first business object and a second business object includes receiving a selection of a first business object and performing one or more actions on the first business object. When a triggering event is detected, one or more conditions are evaluated. A message may be assembled, depending on an outcome of the evaluation. In an embodiment, mapping information between the first business object and a second business object is used to define the message. In an embodiment, the triggering event is a SAVE operation.

The method may further include instantiating a process agent and detecting, by the process agent, a first action among the one or more actions, wherein when the first action is detected by the process agent, then performing the steps of evaluating, assembling, and sending.

In embodiments, the mapping definition defines a mapping between elements of the first business object and elements of the second business object. The method may include modifying the second business object using the contents of the message.

The method may include a design time environment in which a user specifies the first and second business objects. Elements of the first and second business objects are displayed. The user may provide a mapping between respective elements of the first and second business objects. A runtime object may be produced based at least on the mapping information, wherein the runtime object includes the mapping definition.

In embodiments, the first business object is provided in a first deployment unit and the second business object is provided in a second deployment unit different from the first deployment unit.

BRIEF DESCRIPTION OF THE DRAWINGS

FIG. 10 depicts a typical definition of a business object.

FIGS. 12-18 represent screenshots of various interfaces in the Service Integration Wizard in accordance with the present invention.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
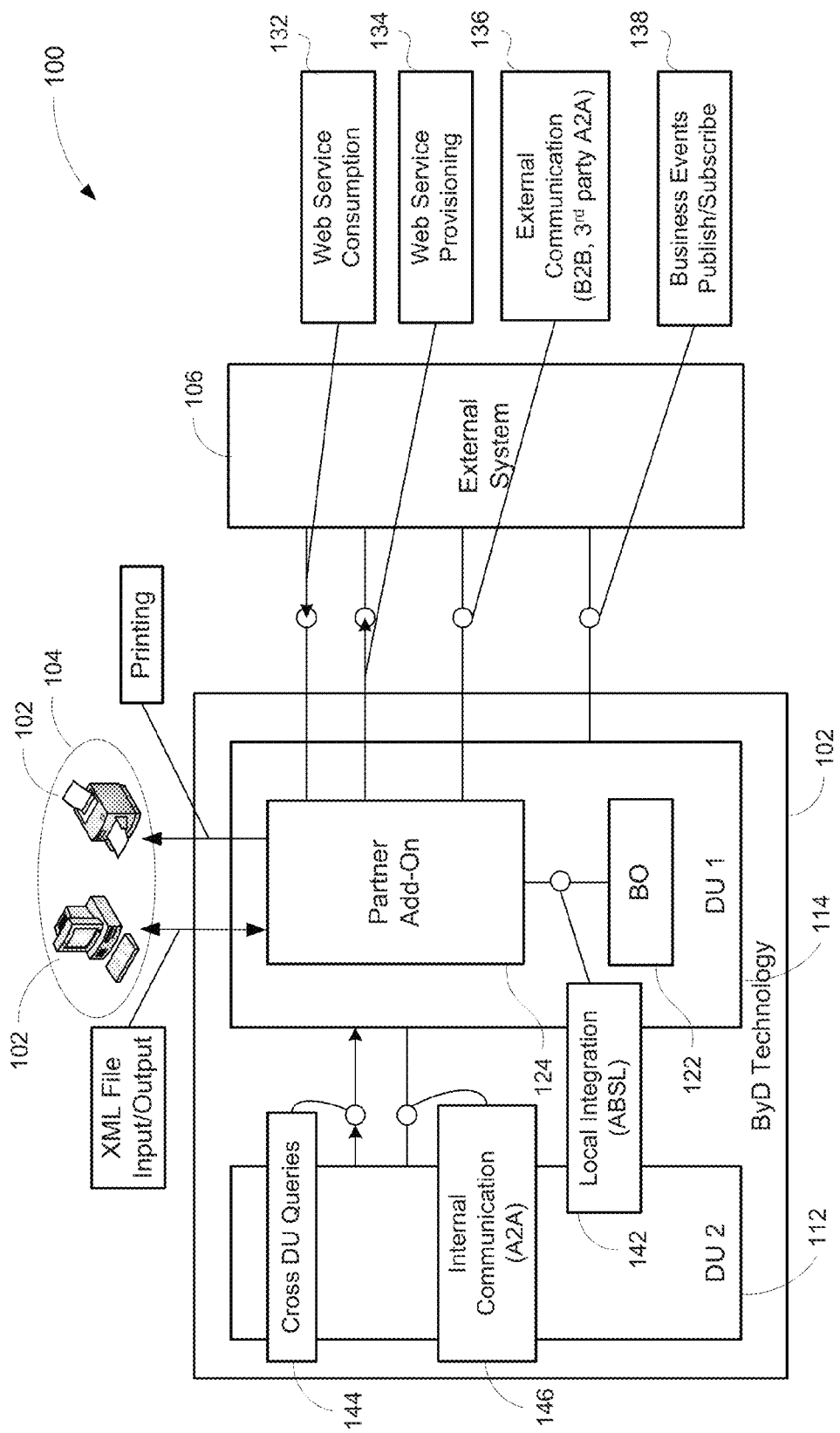
FIG. 1 illustrates a high level diagram of a business solution for a business enterprise.

Referring to FIG. 1, a system 100 for managing a business may comprise an application platform 102, peripheral components 104, and one or more external systems 106. The application platform 102 provides the underlying technology for business applications and business objects for managing the business. The platform underlying technology may comprise a combination of hardware (e.g., servers) and software. In embodiments, the application platform 102 may comprise two or more deployment units 112, 114.

Figure 1A:
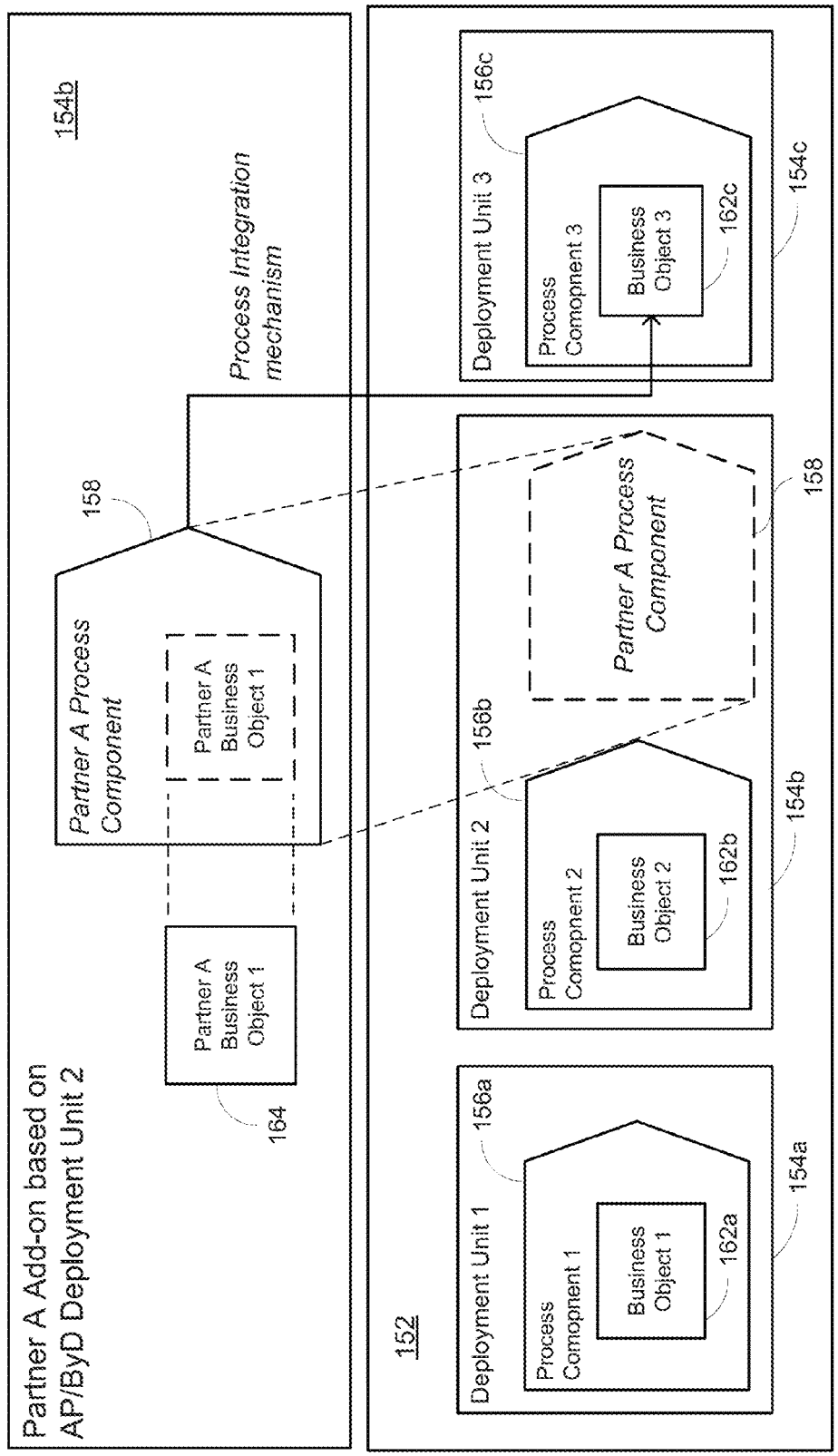
FIG. 1A illustrates deployment units and Partner defined business objects.

Referring for a moment to FIG. 1A, in embodiments, an application platform 152 that supports the business solution for a business enterprise may comprise one or more deployment units 154a, 154b, 154c. Each deployment unit 154a, 154b, 154c comprises, one or more process components 156a, 156b, 156c. Each process component 156a, 156b, 156c, in turn, may include one or more business objects 162a, 162b, 162c.

The process components in a deployment unit may be developed by the platform provider for the business Partner. For example, deployment unit 154a may be a CRM system to support the Partner's customer base, deployment unit 154b may be an HCM system, and so on. When a Partner wants to develop a new solution as an add-on to their existing solution, the new business object and any support software applications are enveloped in a process component 158 within a given deployment unit 154b. The Partner may design and develop their own business object(s) 164, along with applications which would execute within the process component 158. The deployment unit 154b may provide a mechanism for allowing the add-on business object 164 to exchange information with other business objects 162b within the deployment unit. In embodiments, a mechanism referred to as a "process integration" (also, "service integration") allows business object 164 to exchange information with other business objects 162c within a deployment unit 154c other than its host deployment unit 154b.

Returning to FIG. 1, the application platform 102 shows two deployment units 112, 114. For example, deployment unit 112 may provide CRM business functions and it will be understood that the deployment unit provides the underlying technology for business applications relating to CRM and the business objects used to support the CRM function. It will be understood that such underlying technology may be in the form or hardware (one or more servers) and software. Similarly, deployment unit 114 may provide HCM business functions and may comprise business application(s) and business objects specific to supporting HCM functionality.

The deployment unit 112 shows a business object (BO) 122 and a Partner add-on 124. The business object 122 represents a business object that was previously developed and deployed in the deployment unit 112. The Partner add-on 124 may represent a new business object to be integrated into the business system 100. FIG. 1 illustrates various integration scenarios with the Partner add-on 124 in accordance with various aspects of the present invention. A brief overview is provided.

A. External Integration

External integration scenarios encompass embodiments where the Partner add-on 124 interacts with one or more external system 106. In an embodiment, interaction with an external system 106 may be made by calling external Web Services (WS), providing Web Services to expose functionality, and so on. One form of interaction, for example, may be lightweight WS consumption 132 where the logic of the Partner add-on 124 makes synchronous Web Service calls. Other protocols such as Representational State Transfer (REST), extended markup language (XML), JavaScript Object Notation (JSON), and so on may be employed. The counterpart of the Web Service consumption 132 is the provisioning. In an embodiment, for example, some functionality provided by the Partner add-on 124 or may be made available to external consumers in response to inbound synchronous requests. This may include providing a corresponding web services definition language (WSDL) file with end point configuration.

In embodiments, the Partner add-on 124 may be integrated with external processes via external communication 136. In this case, the integration may take place at a higher semantic (business) level, and in general may consist of an orchestrated sequence of web service calls in both directions between the Partner add-on 124 and the external process. In general, the communication may be asynchronous.

The Partner add-on 124 may be integrated with the occurrence of business events 138. This integration scenario is about sending simple asynchronous notification messages whenever some condition triggers. For example, the trigger may be related to a BO event, to a BO state transition, and so on. Notifications can be created without knowledge about receivers using a "send and forget" communication model.

B. Internal Integration

In embodiments of internal integration scenarios, the Partner add-on 124 may be integrated using functionality provided by the application platform 102. Two classes of internal integration scenarios are recognized: (1) the Partner add-on 124 is located in the same deployment unit as the BO (Local Integration); and (2) a cross-DU communication is necessary (Internal X-DU Query, Internal Process Integration).

Local integration 142, in some embodiments, happens between two BO's in the same deployment unit. Local integration 142 may be realized by creating modeled associations between the Partner BO and the BO provided by the platform provider and accessing the BO directly from the business logic of the partner BO.

In some embodiments, internal X-DU (cross-deployment unit) queries 144 may involve a BO in one deployment unit accessing data from a BO in another deployment unit. X-DU queries 144 may be provided by reading information synchronously from the BO in other deployment unit and storing the data in a common data repository.

In embodiments, "internal process integration" 146 is another internal integration approach for communicating across deployment unit boundaries. This kind of integration is usually asynchronous, e.g., triggered by a "SAVE" event on the initiating Business Object (outbound side). At the receiving deployment unit (Inbound), one or more Business Objects may be affected. Since processing of the inbound message is asynchronous, errors and conflicts may require special handling in order to be properly detected and processed. Internal process integration may involve "complex interactions" (e.g., a request-confirmation pattern) that require inbound and outbound communication between the BO's.

Additional integration scenarios include integration with external files 104a. Partners may want to integrate their add-on using external files; e.g., XML-based files. Partners may want to provide their add-on 124 with access to a printer 104b.

Figure 2:
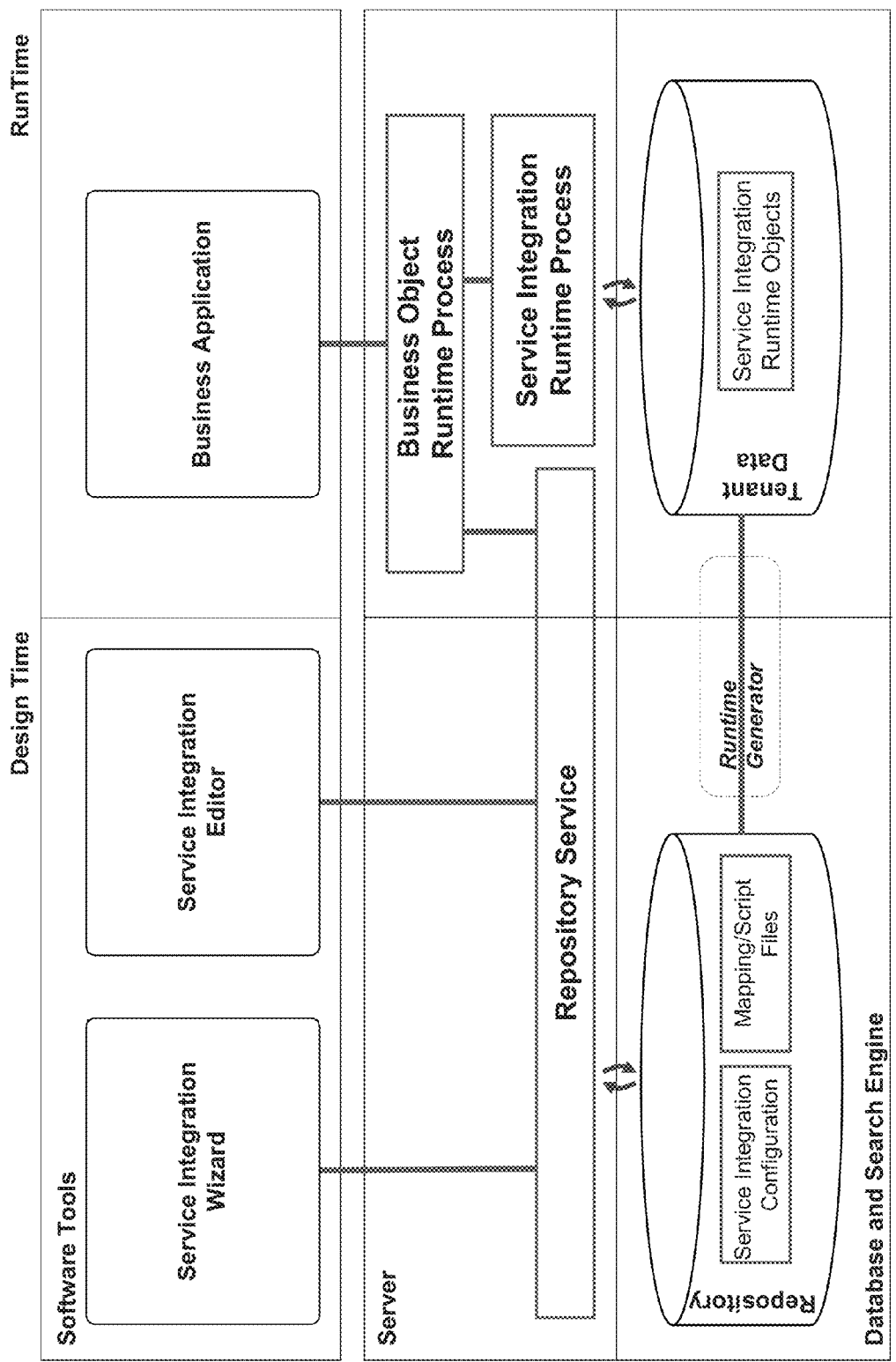
FIG. 2 is a system level diagram of a design time environment and a run time environment in accordance with the present invention.
Figure 3:
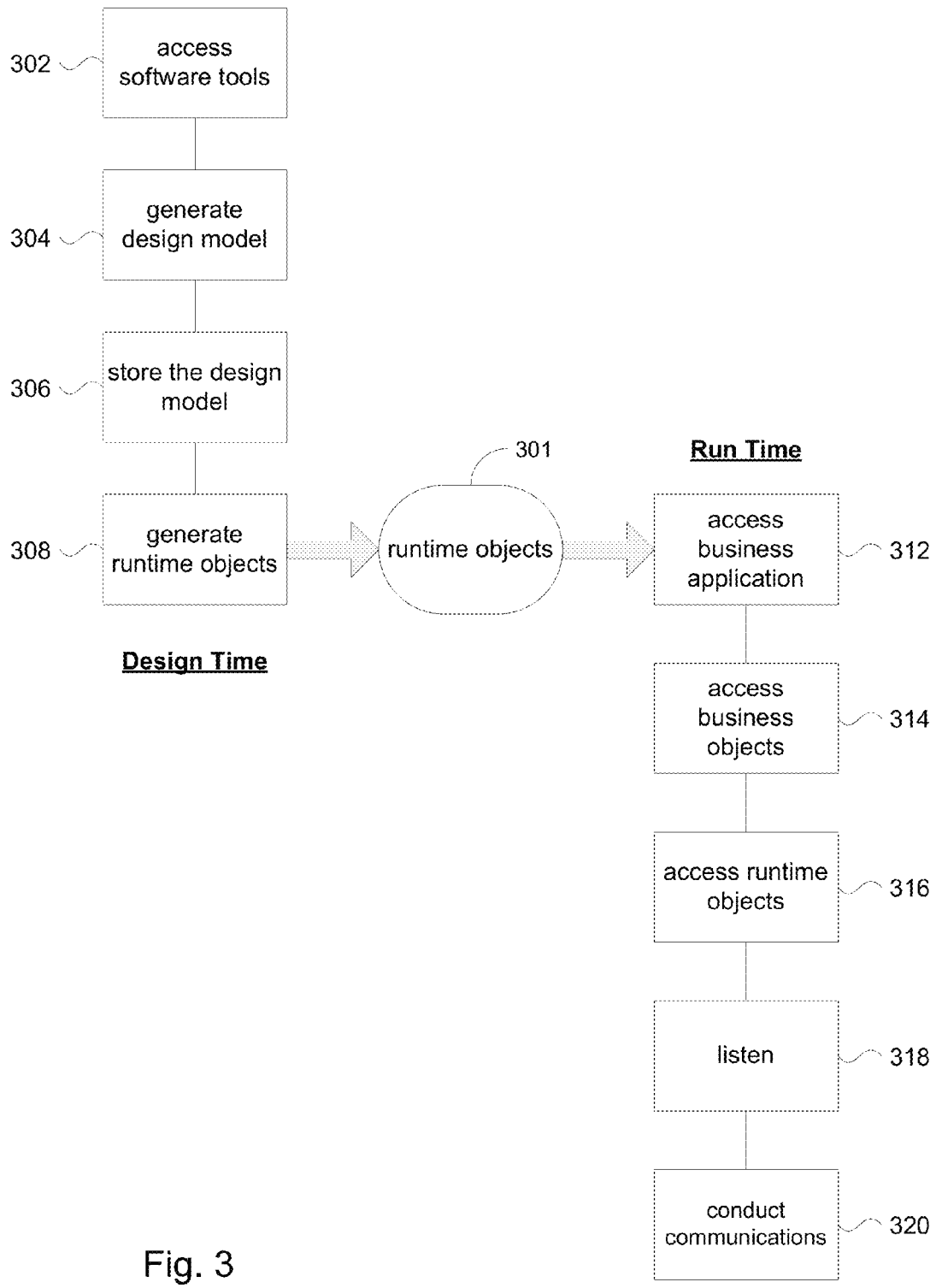
FIG. 3 illustrates processing in a design time environment and a run time environment in accordance with the present invention.

Referring to FIGS. 2 and 3, a high level description of the design time environment and run time environment in accordance with principles of the present invention will be discussed. The term "process integration" used above and the term "service integration" introduced below will be used interchangeably to refer to the integration of business objects which reside in different deployment units.

The design time environment allows the Partner user to customize their business solution; for example, by defining additional business objects to address their specific needs. The design time environment comprises a front end component which includes the software tools (e.g., service integration wizard, service integration editor, and so on) that allow a user (e.g., an IT support person in the business enterprise) to integrate their business objects (e.g., Partner add-on 124 in FIG. 1) with other business objects which may be local the user's deployment unit or in another deployment unit. In a step 302, a user may access the software tools to design and define a configuration for integrating their add-on business object with other business objects. Additional details of the service integration tools will be discussed below. In a step 304, the software tools generate a design model associated with the add-on business object that represents the particular configuration of their integration design. In embodiments, the design model generated by the software tools include service integration configuration and mapping and script files. In a step 306, the design model may be stored in a repository via a repository service (e.g., a database server). In accordance with aspects of the present invention, a runtime generator process generates (in a step 308) a service integration runtime object which corresponds to the add-on, and stores the service integration runtime object 301 in a tenant data store. As will be explained below, the service integration runtime object 301 for a business object comprises one or more process agents.

Although not depicted in FIG. 2, the repository stores definitions and configurations of the business objects themselves. For example, the platform provider may define, develop, and configure a set of business objects specifically for the business Partner (e.g., in a collaborative effort with the business enterprise), which are then stored in the repository. Likewise, the business Partner, using suitable software tools (not shown) may develop, define, and configure their own add-on business objects to enhance their business management operations. The add-on business objects may be stored in the repository.

The runtime environment is the place where the Partner is actually using their business solution to run their business. In the runtime environment, the Partner user (e.g., an end-user in the business enterprise such as a sales person, an administrative person in the human resources department, and so on) may conduct their business-related activity using a suitable business application (step 312). In a step 314, using the business application, the user may access one or business objects stored in the repository via a business object runtime process and perform one or more operations on the business objects; e.g., the user may update sales figures for a customer. In accordance with principles of the present invention, the business object runtime process informs the service integration runtime process of business objects that it is processing. In a step 316, the service integration runtime process retrieves any service integration runtime objects 301 that correspond to business objects being processed by the business object runtime process. Using the service integration runtime objects, the service integration runtime process "listens" (in a step 318) for the occurrence of triggering events (e.g., a SAVE operation) on their corresponding business objects and conducts (in a step 320) communications in order to communicate data from the "outbound" business object to "inbound" business object(s) specified in the service integration runtime object.

Figure 4:
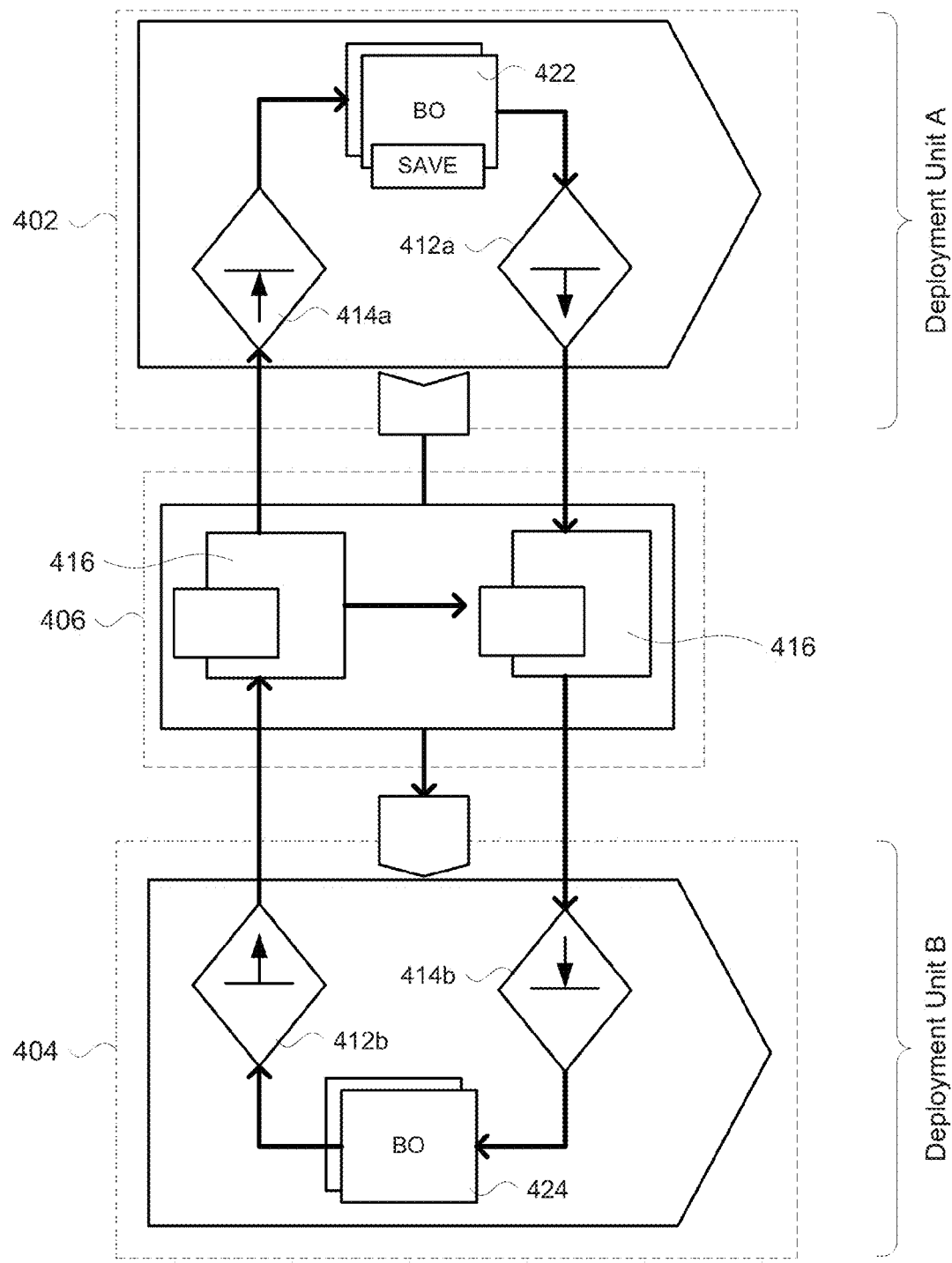
FIG. 4 represents a service integration model in accordance with principles of the present invention.
Figure 5:
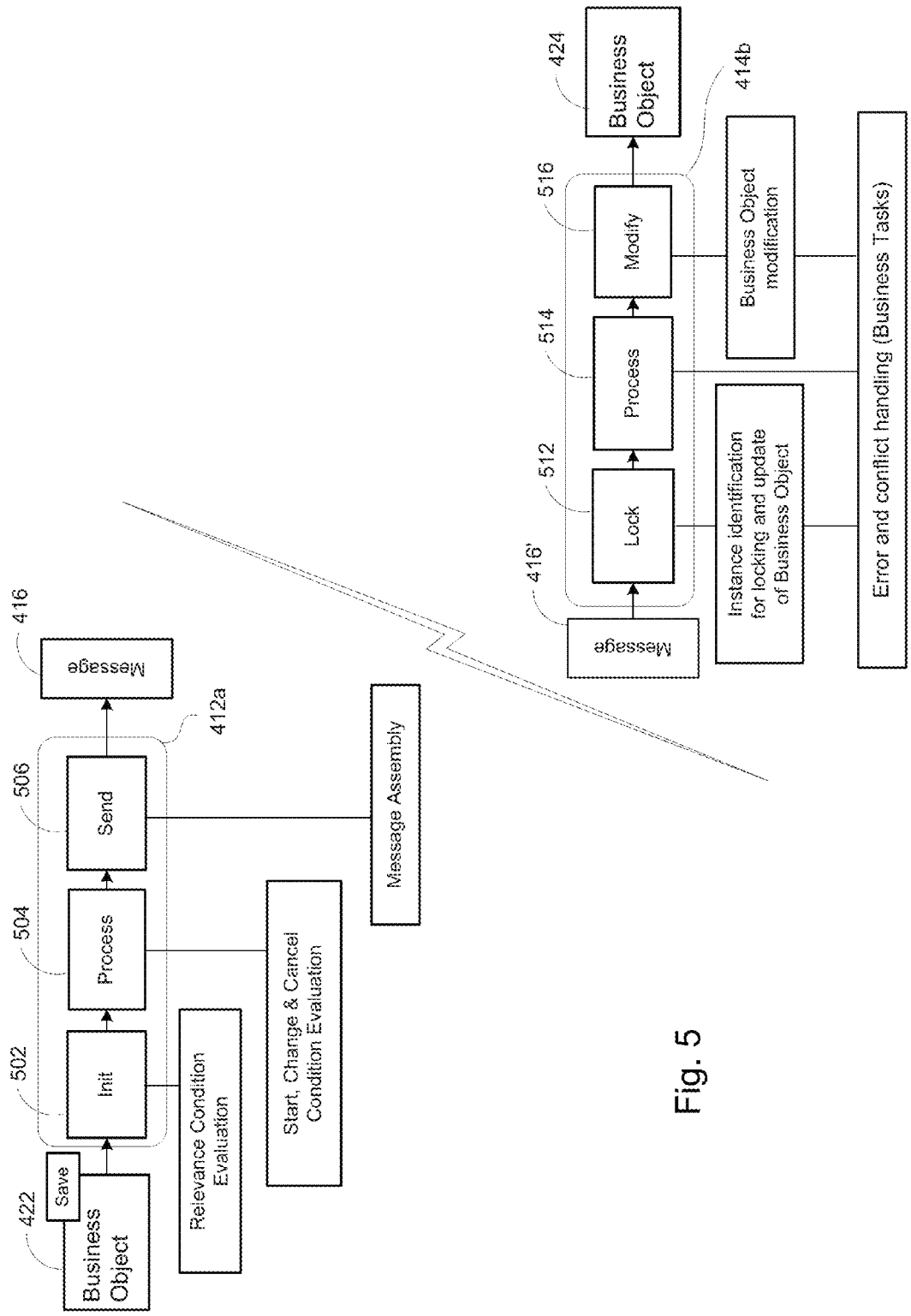
FIG. 5 illustrates logical view of process agents, outbound and inbound.

Referring to FIG. 4, a service integration model in accordance with principles of the present invention will now be described. A business object 422 in one deployment unit plays the role of a triggering actor 402, for example, when someone modifies the business object and performs a SAVE operation. This initiates a service integration communication with a business object 424 (located in another deployment unit) which plays the role of a reacting actor 404.

The service integration model defines a mechanism for exchanging information between business objects that reside in separate deployment units. An interaction model 406 is defined by one or more interaction messages 416. The interaction message 416 specifies a message structure and an operation; e.g., CREATE, DELETE, UPDATE and so on. The message 416 is initiated by the triggering actor 402 and is sent to the reacting actor 404.

The actors 402, 404 represent an actual implementation of the service integration interaction and correspond to the service integration runtime objects discussed above in FIG. 2. In embodiments, each actor 402, 404 comprises one or more process agents 412a, 412b, 414a, 414b to facilitate service integration between respective business objects 422, 424. In embodiments, each process agent is associated with a respective business object, and a business object may be associated with two or more process agents.

An aspect of the service integration model shown in FIG. 4 is asynchronous communication. The communication may be triggered, for instance, by a SAVE operation that a user may perform after completing a task on a business object. The communication is asynchronous in that the triggering actor 402 does not wait for a reply from the reacting actor 404 after the triggering actor sends the message 416 to the reacting actor. Of course, the reacting actor 404 may send a subsequent "response" message to the triggering actor 402 that relates to the initial message (e.g., results of analysis); however, role reversal occurs where the actor 404 takes on the role the triggering actor and actor 402 is the reacting actor. An outcome of asynchronous communication is that messages are only sent in one direction.

Another aspect of the service integration model shown in FIG. 4 is "complete transmission" of messages. The message 416 is deemed to contain all of the data in the target business object 424. If a corresponding datum in the target business object 424 is found in the message 416, then that datum in the target business object is replaced by the corresponding datum in message. If a corresponding datum in the target business object 424 is not found in the message 416, then that datum in the target business object is deleted. In an embodiment, the message 416 may include a "Prevent Data Deletion" flag so that such deletions in the target business object 424 are not made.

As indicated above, process agents 412a, 412b, 414a, 414b realize service integration between respective business objects 422, 424. In accordance with principles of the present invention, the process agents encapsulate behavior, which autonomously react to some stimulus (Receive), process some information (Action), and either emit a message ("outbound" process agent 412a, 412b) or produce modifications to business objects ("inbound" process agent 414a, 414b). Accordingly, a business object may be associated with multiple process agents; e.g., a business object 422 is associated with an outbound process agent 412a for sending messages, and with an inbound process agent 414a for receiving messages.

Referring to FIGS. 4-7, outbound processing and inbound processing by process agents are illustrated. An outbound process agent 412a may emit messages 416 in response to some triggering event on business object 422. For example, a SAVE event signifying the conclusion of a modification of a source business object 422 may serve as a triggering event. In embodiments, the outbound process agent 412a may comprises an initialization component 502, a processing component 504, and a sending component 506.

Figures 6, 7:
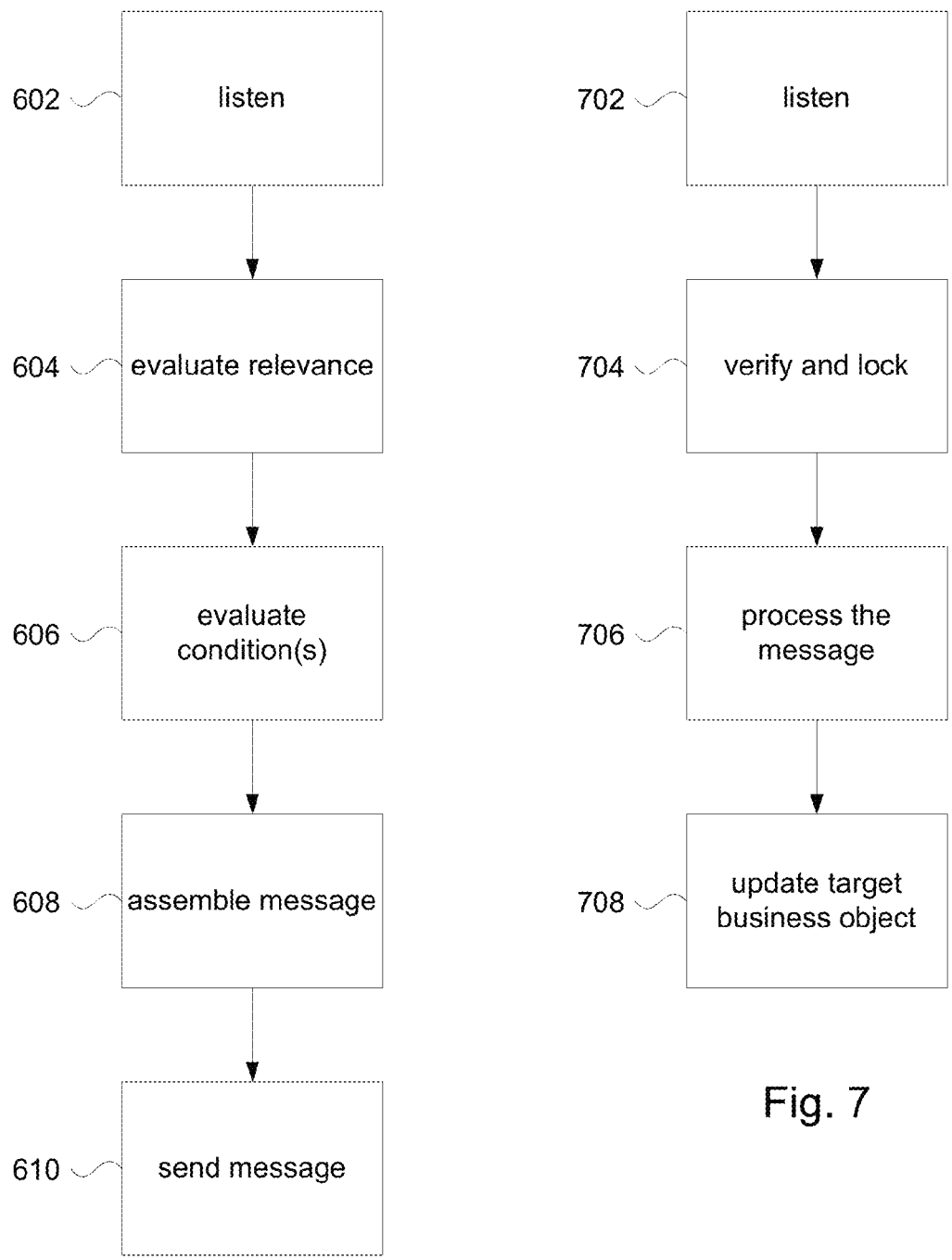
FIGS. 6 and 7 represent outbound and inbound process flow, respectively.

Referring to FIG. 6, the outbound process agent 412a "listens" (step 602) for a triggering event on its associated business object; e.g. a SAVE operation on the source business object 422. In a step 604, the initialization component 502 will evaluate the relevance of the modifications to determine if a message should be sent at all. For example, depending on the business object modifications, the initialization component 502 may determine which nodes of the source business object 422 are relevant. In some embodiments, Partners can specify relevance conditions as expressions on the business object, nodes, and elements, using a suitable scripting language that can be processed (e.g., compiled) by the runtime generator process (FIG. 2).

In a step 606, the processing component 504 performs condition evaluation. In the case of large update messages, it may be desirable not to transmit the message 416 in "complete transmission" mode. Rather, only the parts that have modifications would be sent; this is referred to as "delta transmission" mode. In some cases, the determination of the deltas is application specific. Accordingly, in some embodiments, the Partner may specify the deltas for each business object node as a set of rules (e.g., Start, Cancel, Change conditions). These rules may comprise Boolean expressions represented in a suitable scripting language that can be processed by the runtime generator process (FIG. 2).

In a step 608, the sender component 506 may assemble the message 416. After determining the parts of the message to be sent in the processing (step 504), those parts may be assembled from information of the business object and associated elements. In embodiments, Partners may specify the mapping between elements of the source business object 422 and corresponding elements in the target business object 424 using a graphical mapping tool. The message 416 may be expressed using any suitable message format; e.g., extended markup language (XML), and so on, and may be transmitted using any suitable communication protocol; e.g., Web Services, Simple Object Access Protocol (SOAP), and so on. The assembled message is then sent in a step 610 in asynchronous fashion.

Returning to FIG. 5, an inbound process agent 414b executing in another deployment unit may modify a business object 424 when it is triggered by receipt of a message 416'. In embodiments, the inbound process agent 414a may comprise a lock component 512, a processing component 514, and a modify component 516.

Referring to FIG. 7, in a step 702 the process agent 414b "listens" for incoming messages. In a step 704, after a message 416' is received, the lock component 512 will verify the correctness of the received message 416'. The target business object 424 is identified from information in the message 416', and will be locked in order to prevent other processes in the deployment unit (Deployment Unit B) from accessing the business object at the same time; basically, to prevent data corruption of the business object. In a step 706, the message 416 is processed in the process component 514 of the inbound process agent 414b. Among other things, data contained in the message 416' may replace data in the target business object 424. In a step 708, modifications to the target business object 424 are made permanent by the modify component 516 by saving them into the repository (FIG. 2) where the business object is stored. Error processing may occur anytime during processing by any of the components of the inbound process agent 414b. Errors may include identifying and handling conflicts between the data in the received message 416'.

Figure 8:
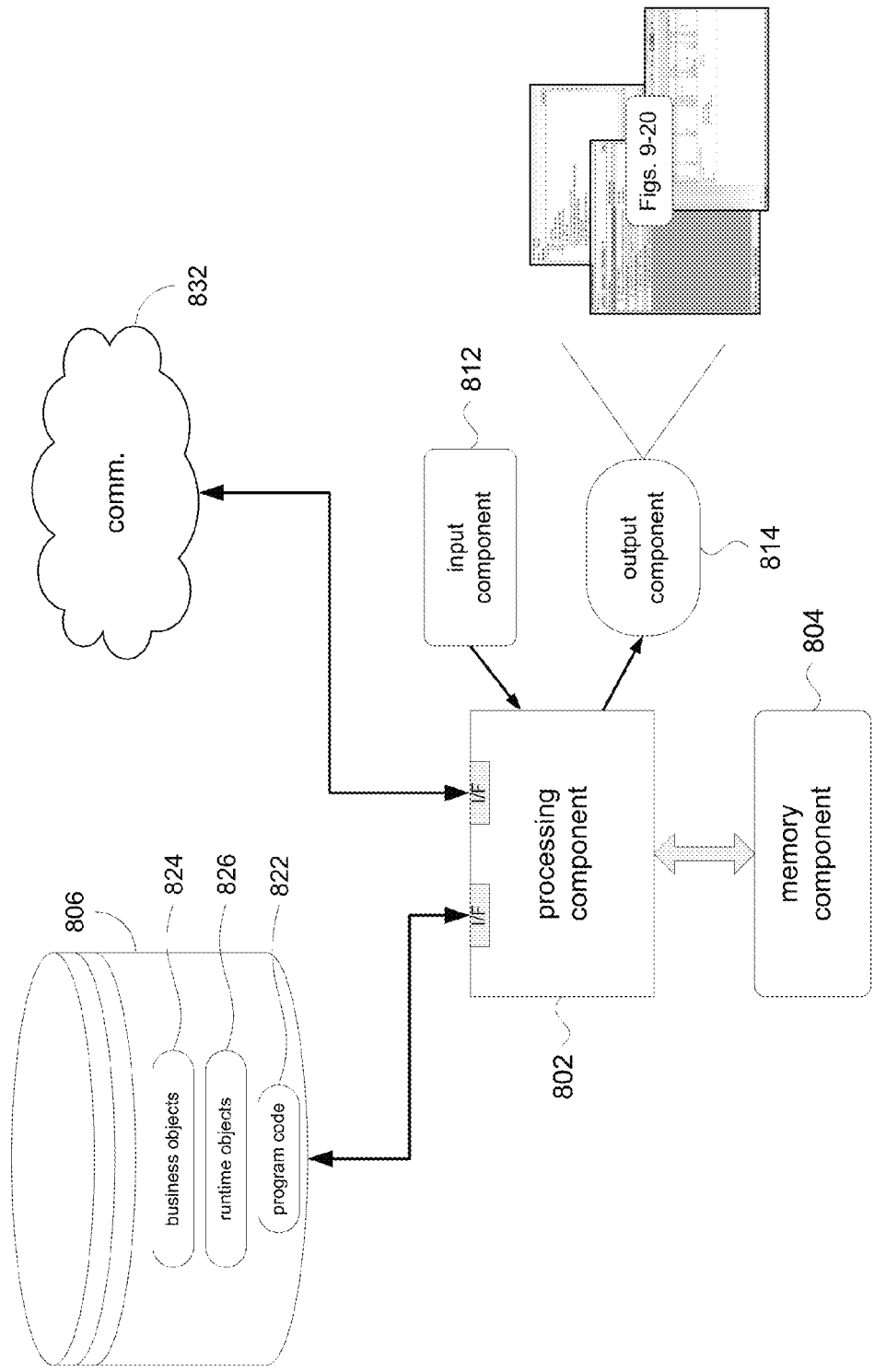
FIG. 8 represents a block diagram of a computer system in accordance with disclosed embodiments.

In embodiments, application platform 102 (FIG. 1) and deployment units 112, 114 may comprise one or more computer system components and appropriate software components (FIG. 2) executing on the computer system components. FIG. 8 is a high level block diagram of a computer system that may be embodied in accordance with the present invention. A processing component 802 includes a memory 804 and suitable I/O components 812, 814 for interaction with a user. For example, input component 812 may comprise a keyboard, a mouse device, and so on. In the case of mobile devices, the input component 812 may be a virtual keyboard provided on a touch screen device. The output component 814 may comprise a suitable display for displaying user interface (UI) screens, and in the case of a mobile device may be a touch screen display. The memory component 804 may comprise random access memory (RAM), read-only memory (ROM), flash memory, and so on.

The processing component 802 may include a communication interface for communication over a communication network 832 (such as a local area network, LAN). In an embodiment, for example, a first deployment unit may communicate with another deployment unit in the business enterprise over a LAN, using the SOAP protocol.

The processing component 802 may include data storage 806 for persistent data storage, and may comprise a hard disk drive, optical storage devices, and so on. The data storage 806 may comprise a combination of a local data store and a data storage system. Business objects 824 and service integration runtime objects 826 may be stored on the data storage 806.

Program code 822 stored on the data storage device 806 may include various an operating system (OS) and various applications such as business applications. For example, if the processing component 802 is configured in a deployment unit developed for CRM, then the program code 822 may comprise various CRM-type applications. Program code 822 may be executed by the processing component 802 to cause the processing component to be perform the steps disclosed herein.

Figure 9:
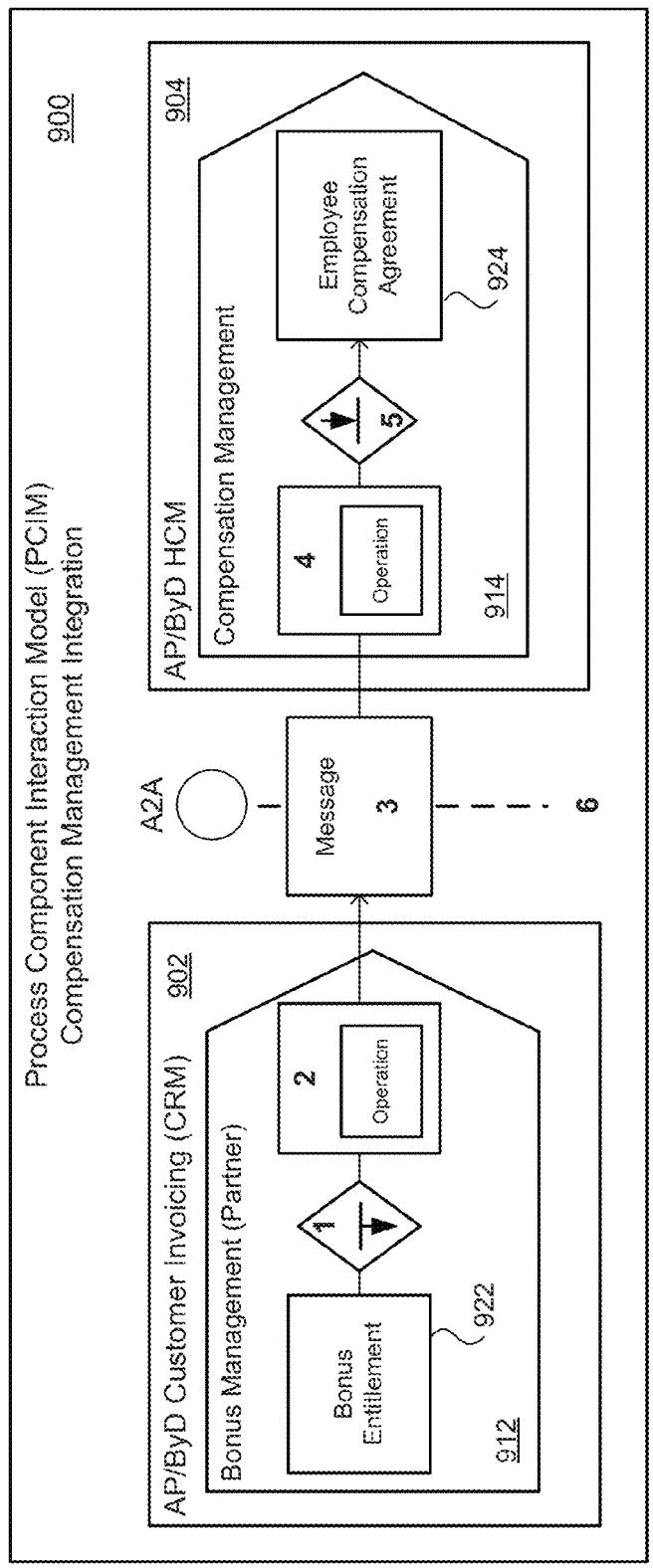
FIG. 9 represents a service integration model for a particular use case.

An example use case will now be discussed. Referring to FIG. 9, the use case will assume that a business solution has been provided on an application platform 900 for a business enterprise, and comprises a CRM system deployed in deployment unit 902 and an HCM system (human resources) deployed in deployment unit 904. Suppose the business Partner has decided to implement a bonus program for their sales people. In the use case, the Partner has developed and built a process component called Bonus Management 912 which includes a business object called Bonus Entitlement 922. FIG. 10 illustrates an example of the Bonus Entitlement business object 922.

In order to pay a bonus to a sales person, an appropriate business object in the HCM system 904 must be informed. In particular, the Compensation Management process component 914 manages an Employee Compensation Agreement business object 924 to which bonus information from the CRM system 902 must be sent in order to pay a bonus to the sales person. An internal communication mechanism in accordance with principles of the present invention has been discussed above, including processing explained in FIGS. 2 and 3. Following are UI screens to show how the user views the system and specifies information to accomplish the task.

FIG. 9 shows five components comprising the internal communication mechanism. The outbound process agent 1 detects changes made to the Bonus Entitlement business object 922 and performs processing to create a message 3 that is received by the inbound process agent 5 and targets the Employee Compensation Agreement business object 924. FIG. 9 shows service interface components 2 and 4. These conventional components support SOAP and Web Services protocols for sending the message 3.

Figure 11:
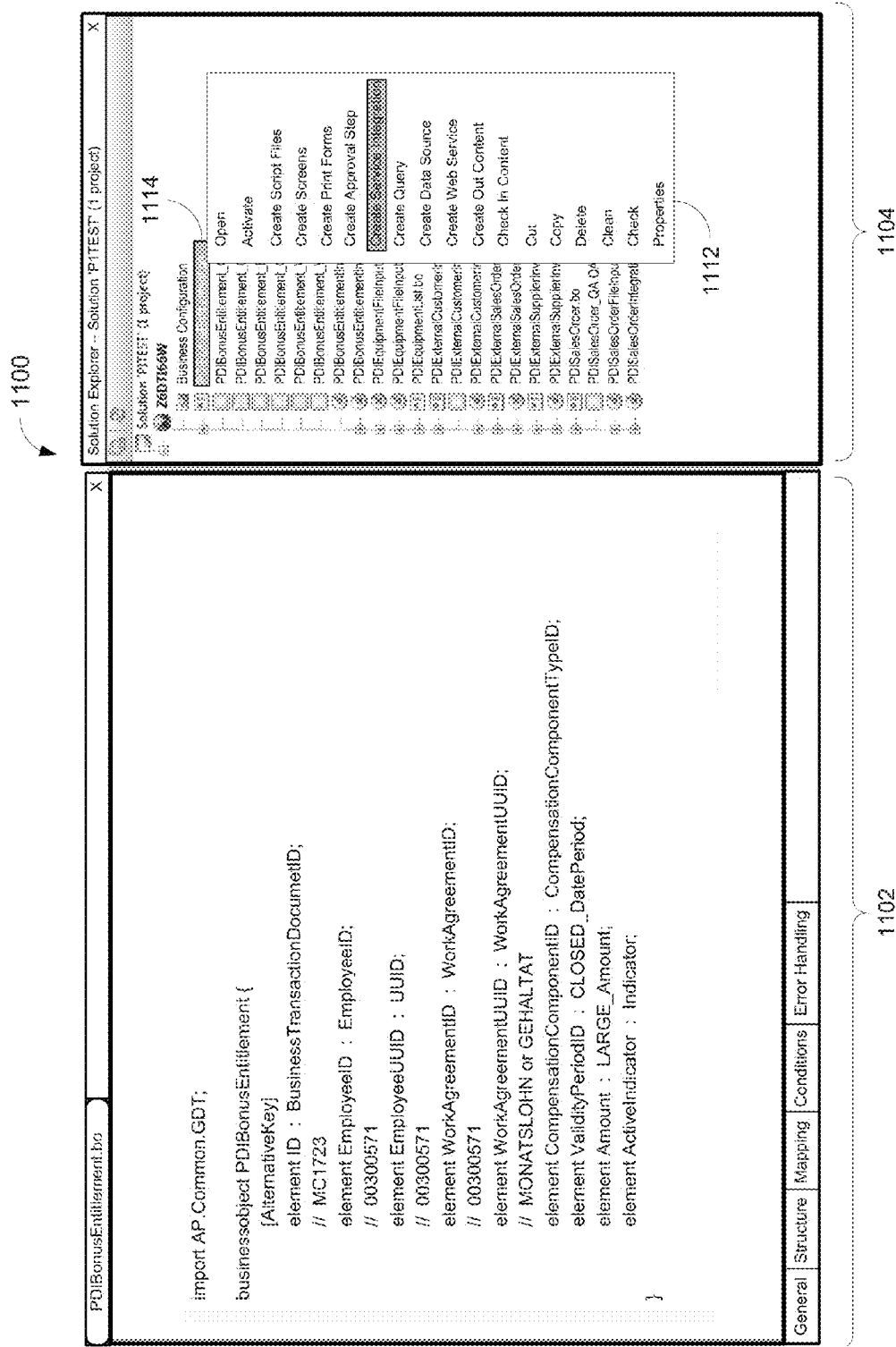
FIG. 11 represents a screenshot of an interface in accordance with the present invention, depicting launching of a Service Integration Wizard.

FIG. 11 illustrates a screenshot of an interface 1100 in the design time environment (FIG. 2) that may be used to select a business object for which a service integration definition will be created. The interface 1100 include a display area 1102 various components (e.g., business objects) of a business solution. A Solutions Explorer area 1104 allows the user to select a component such as a business object to be inspected in the display area 1102.

The screenshot shows a user (e.g., developer) has selected the Bonus Entitlement business object 922, stored in an object entitled PDIBonusEntitlement.bo, which is displayed in the display area 1102. The screenshot further shows that the interface 1100 includes a context menu 1112 (e.g., accessed by "right clicking" on the component name 1114 with a mouse input device) listing various actions that can be performed on the selected business object. The screenshot shows the user has selected the "Create Service Integration" action from the context menu 1112. In embodiments, this will invoke a Service Integration Wizard.

Figure 12:
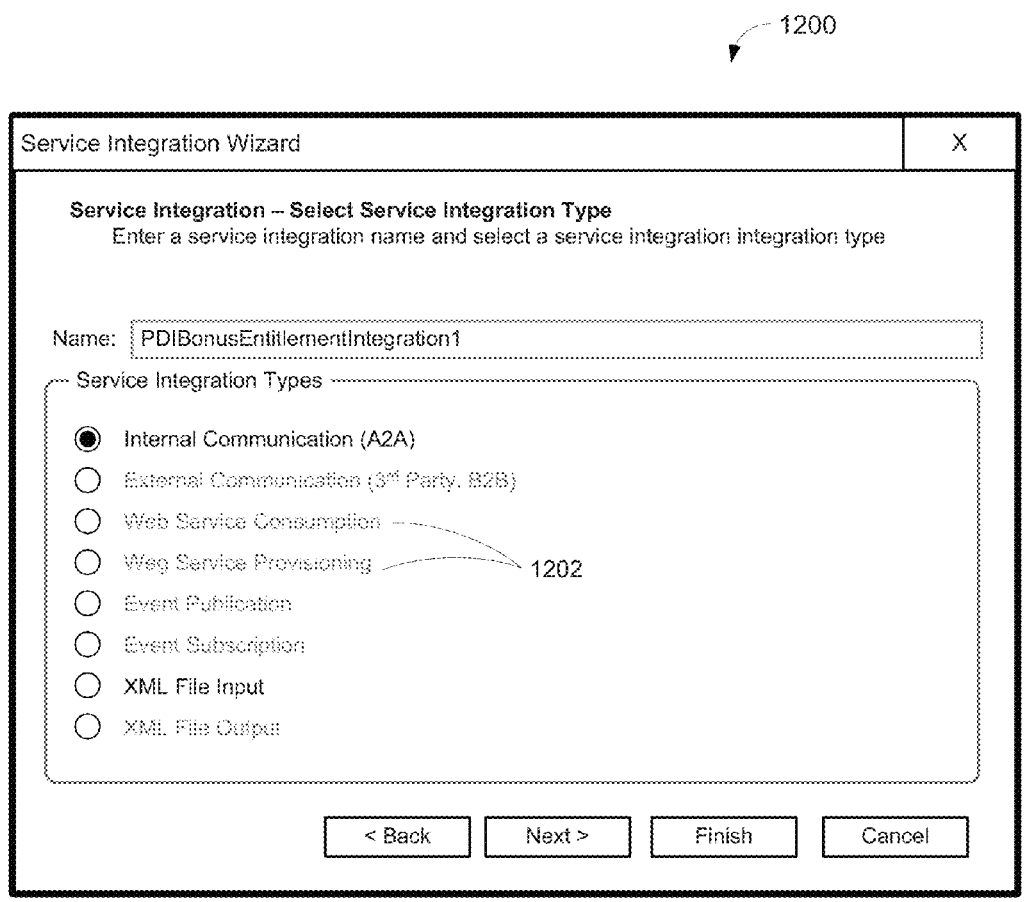

FIG. 12 illustrates a screenshot of an initial interface 1200 in the Service Integration Wizard. A Name field allows the user to specify a name for the service integration being defined. Here the user has entered "PDIBonusEntitlementIntegration1" as the name of the service integration. The interface 1200 includes set of radio buttons allows the user to specify from among different service integration types. Integration types may not be available for some business objects, and so may be grayed out; e.g., web services consumption and provisioning 1202. The interface 1200 shows that the user has "clicked" the radio buttons for specifying internal communication integration (e.g., between business objects) using XML data formatting. The user can proceed to the next screen by "clicking" the NEXT button.

Figure 13:
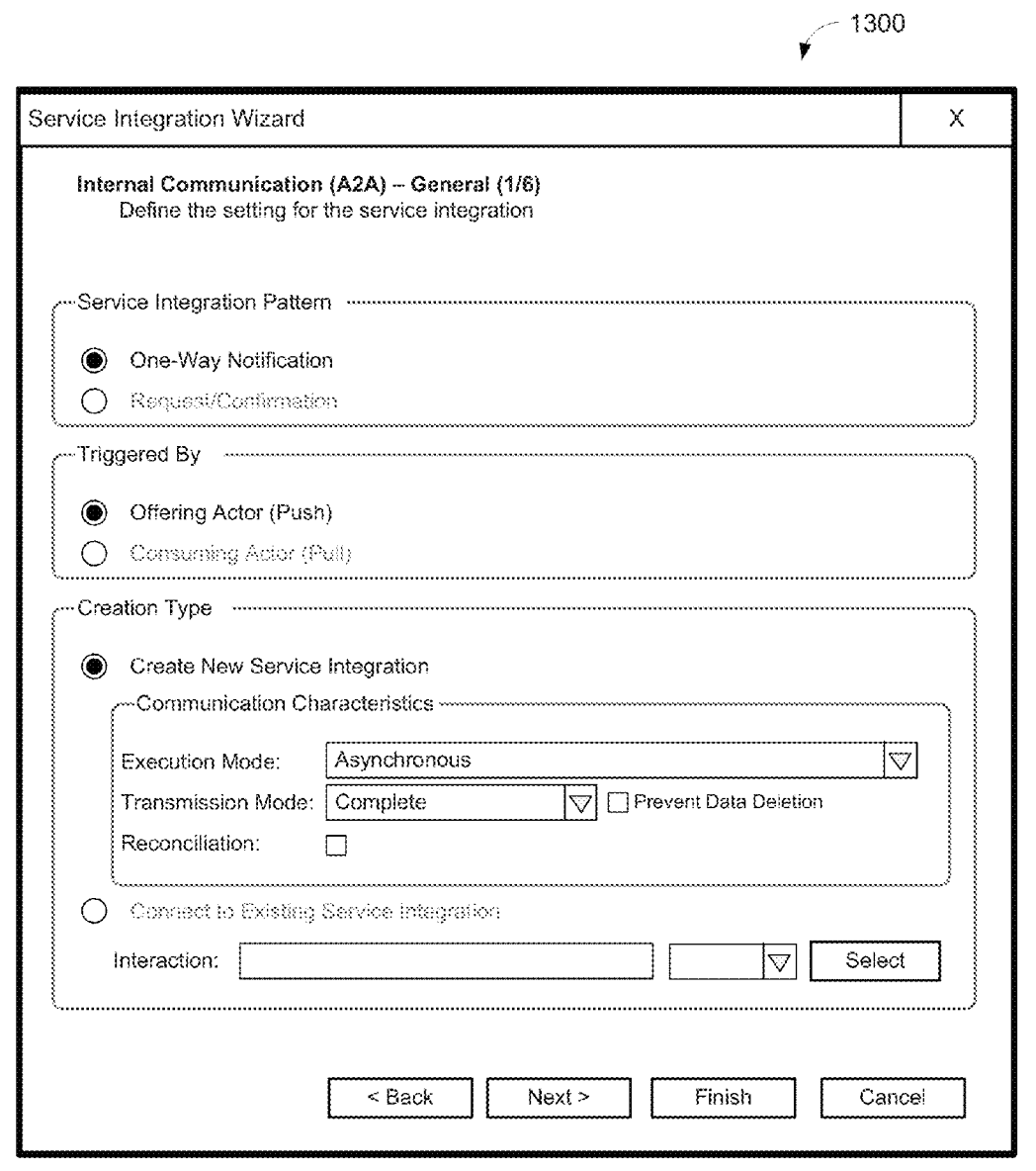

FIG. 13 illustrates a screenshot of an interface 1300 in the Service Integration Wizard for defining an internal communication type of the service integration being defined. The screenshot shows that the user has indicated that the service integration pattern is a one-way notification, the service integration is triggered by an offering actor, and is a new service integration in which the communication (i.e., the message) is provided asynchronously and completely. A prevent data deletion checkbox is selected to indicate that data that is not in the message should not be deleted from the consuming business object and a reconciliation checkbox is selected to indicate support for an error resolution mechanism. Features not applicable or otherwise available to the business object may be grayed out by the interface 1300. The user can proceed to the next screen by "clicking" the NEXT button.

Figure 14:
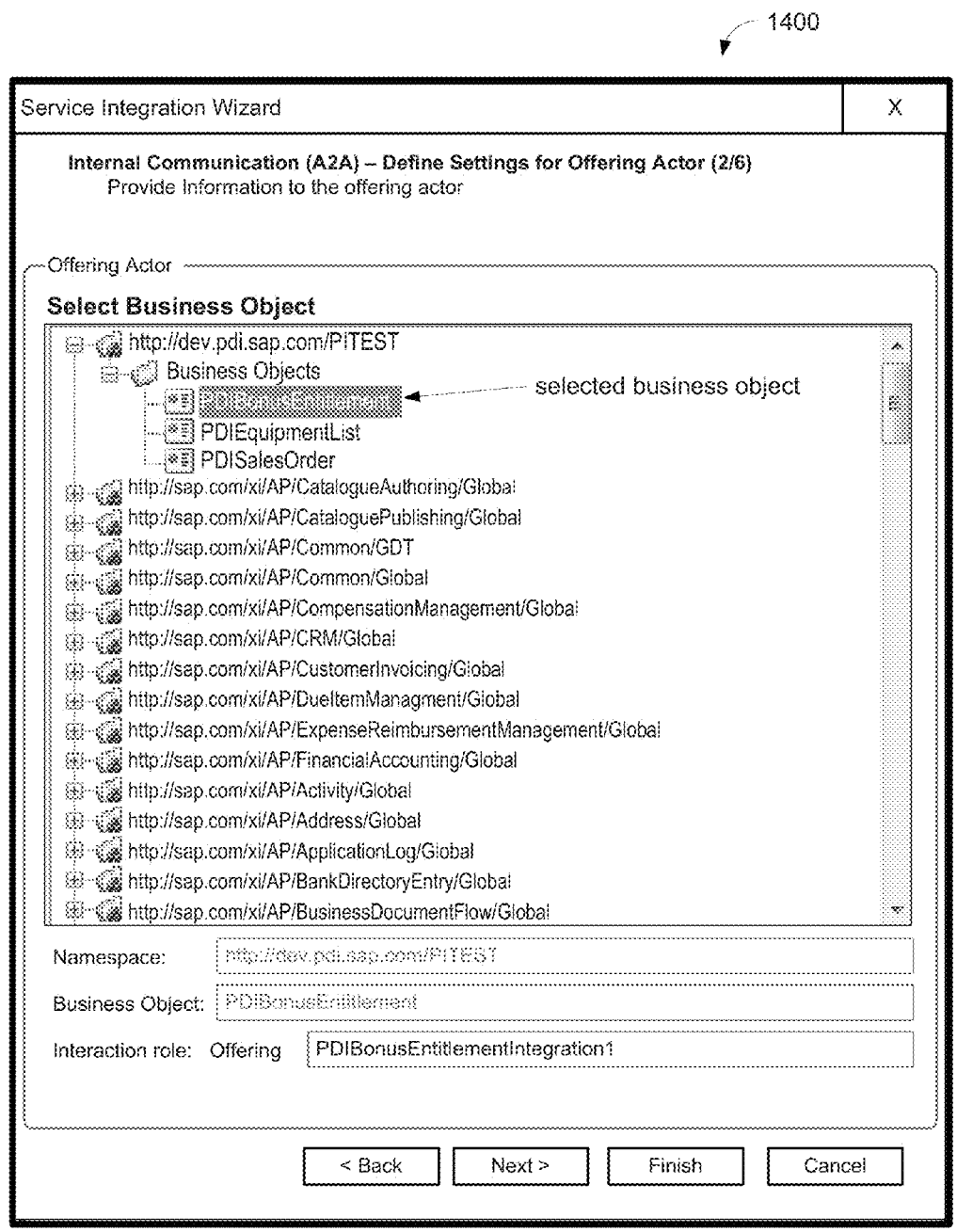

FIG. 14 illustrates a screenshot of an interface 1400 for selecting and defining parameters of an offering actor as part of the process of defining the internal communication service integration. Recall from FIG. 11 that the service integration is being defined for the Bonus Entitlement business object 922. The offering actor may be the Bonus Entitlement business object 922 itself, or may be some other business object. Accordingly, the interface 1400 displays a list of business objects that can serve as an offering actor. In the running example, the offering actor is the Bonus Entitlement business object 922 and so the screenshot shows that the user has navigated down to the Bonus Entitlement business object. The user may enter a name in an Interaction Role input field to describe the interaction role of the offering actor. The screenshot shows that the user has entered the name of the Service Integration (FIG. 11) as the name of the interaction role. The user can proceed to the next screen by "clicking" the NEXT button.

Figure 15:
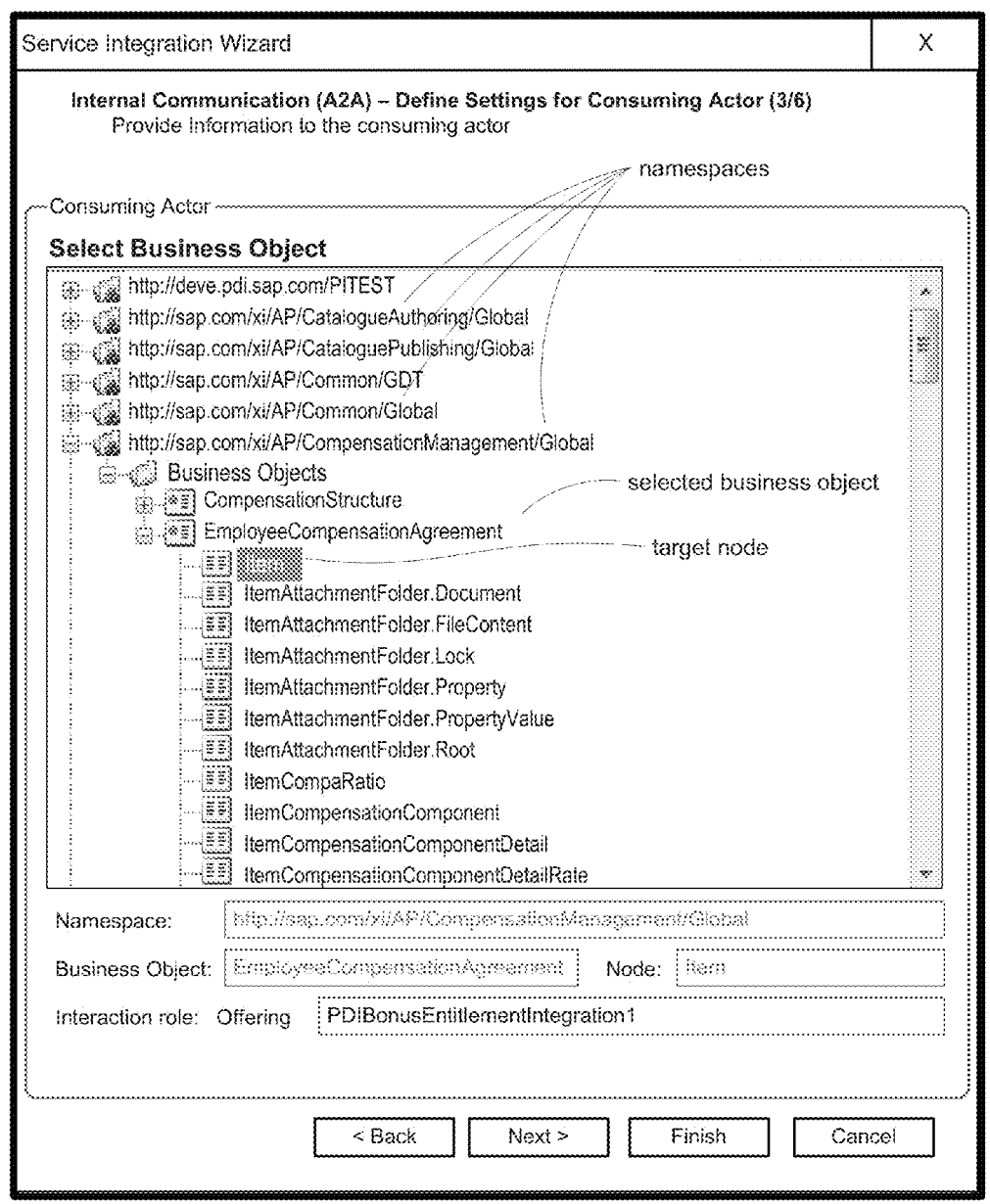

FIG. 15 illustrates a screenshot of an interface 1500 for selecting and defining parameters of a consuming actor as part of the process of defining the internal communication service integration. The interface 1500 displays a list of namespaces including the Compensation Management namespace from which a user may select their business object. Namespaces may be used to define unique sets of names for the Partner's business objects. A deployment unit may support one or more namespaces. The screenshot shows the user has navigated down the Compensation Management namespace and selected the Employee Compensation Agreement business object 924 as the consuming actor. Since the service integration is targeting only a part of the business object, the screenshot shows that the user has navigated into the selected business object to identify a target node within the business object. The screenshot shows that the user has entered the name of the Service Integration (FIG. 11) as the name of the interaction role. The user can proceed to the next screen by "clicking" the NEXT button.

Figure 16:
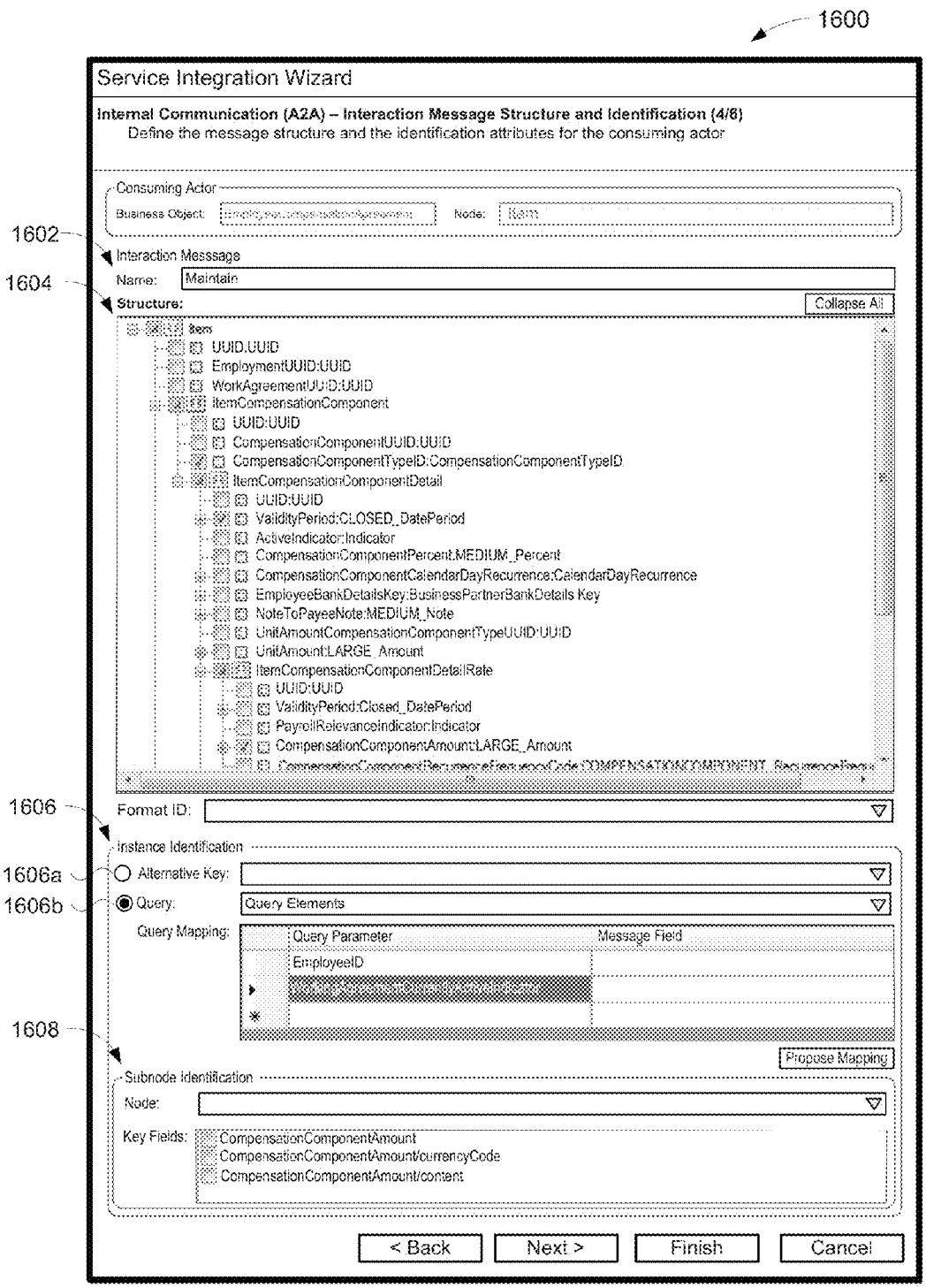

FIG. 16 illustrates a screenshot of an interface 1600 for defining the structure of the message to be sent to the consuming actor (the Employee Compensation Agreement business object 924 in this running example). A Name field 1602 allows the user to specify a name for the message. A Structure window 1604 allows the user to specify the structure of the message by selecting elements of the context nodes and their sub-node(s). For example, the screenshot shows that the user has selected the following:

| sub-node | node |
| --- | --- |
| CompensationComponentTypeID | ItemCompensationComponent |
| ValidityPeriod | ItemCompensationComponentDetail |
| CompensationComponentAmount | ItemCompensationComponentDetailRate |

An Instance Identification area 1606 allows the user to identify an instance of the business object which constitutes the consuming actor. In embodiments, an instance of the target business object may be identified by specifying a key selected from an Alternative Key drop down menu, or by specifying a query. The screenshot shows the user has elected to specify a query as the basis for identifying an instance of the target business object, using EmployeeID and WorkAgreementCurrentlyActiveIndicator as query parameters.

A Subnode Identification area 1608 allows the user to select one or more sub-nodes and key fields for each selected sub-node. The user can proceed to the next screen by "clicking" the NEXT button.

Figure 17:
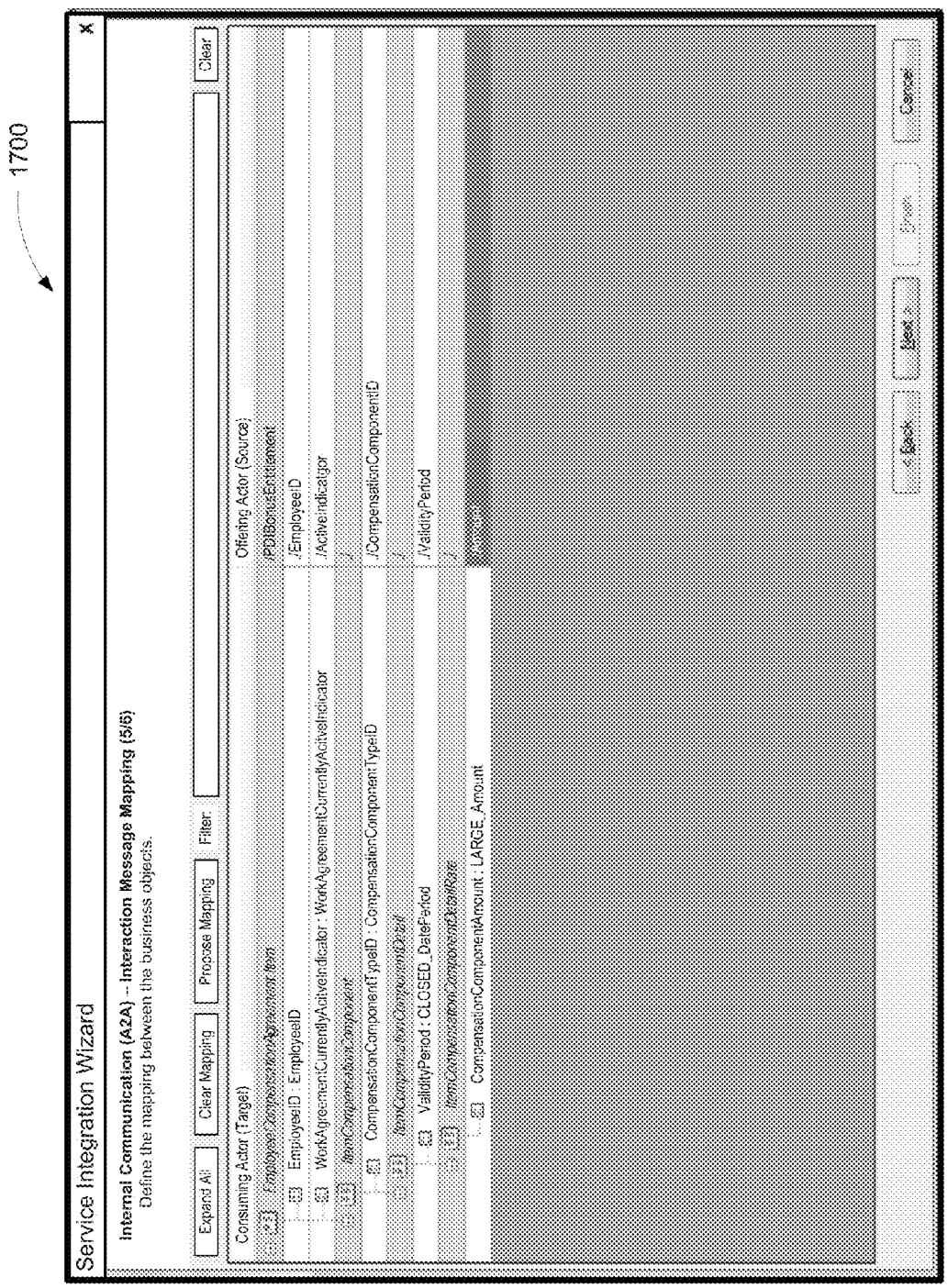

FIG. 17 illustrates a screenshot of an interface 1700 to define a mapping between elements of the offering actor and elements of the consuming actor, for the message. The user can proceed to the next screen by "clicking" the NEXT button.

Figure 18:
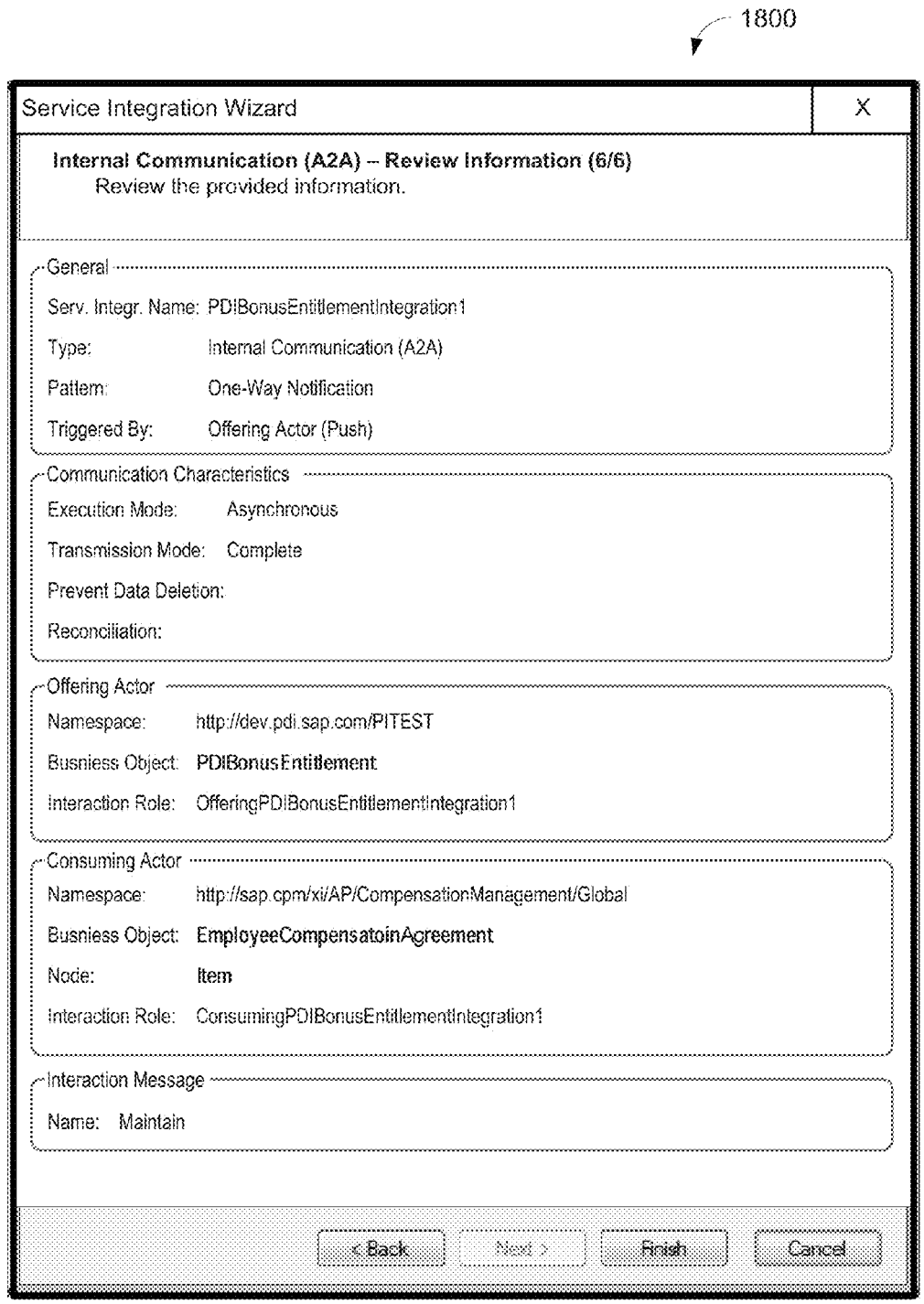

FIG. 18 illustrates a screenshot of an interface 1800 that displays a summary of the internal communication configuration of the service integration definition. A BACK button allows the user to return to previous interfaces to revise the configuration. A FINISH button will save the service integration definition in the repository (FIG. 2) and exit the Service Integration Wizard. The runtime generator process shown in FIG. 2 may begin generating the service integration runtime object(s) from the saved service integration definition.

Figure 19:
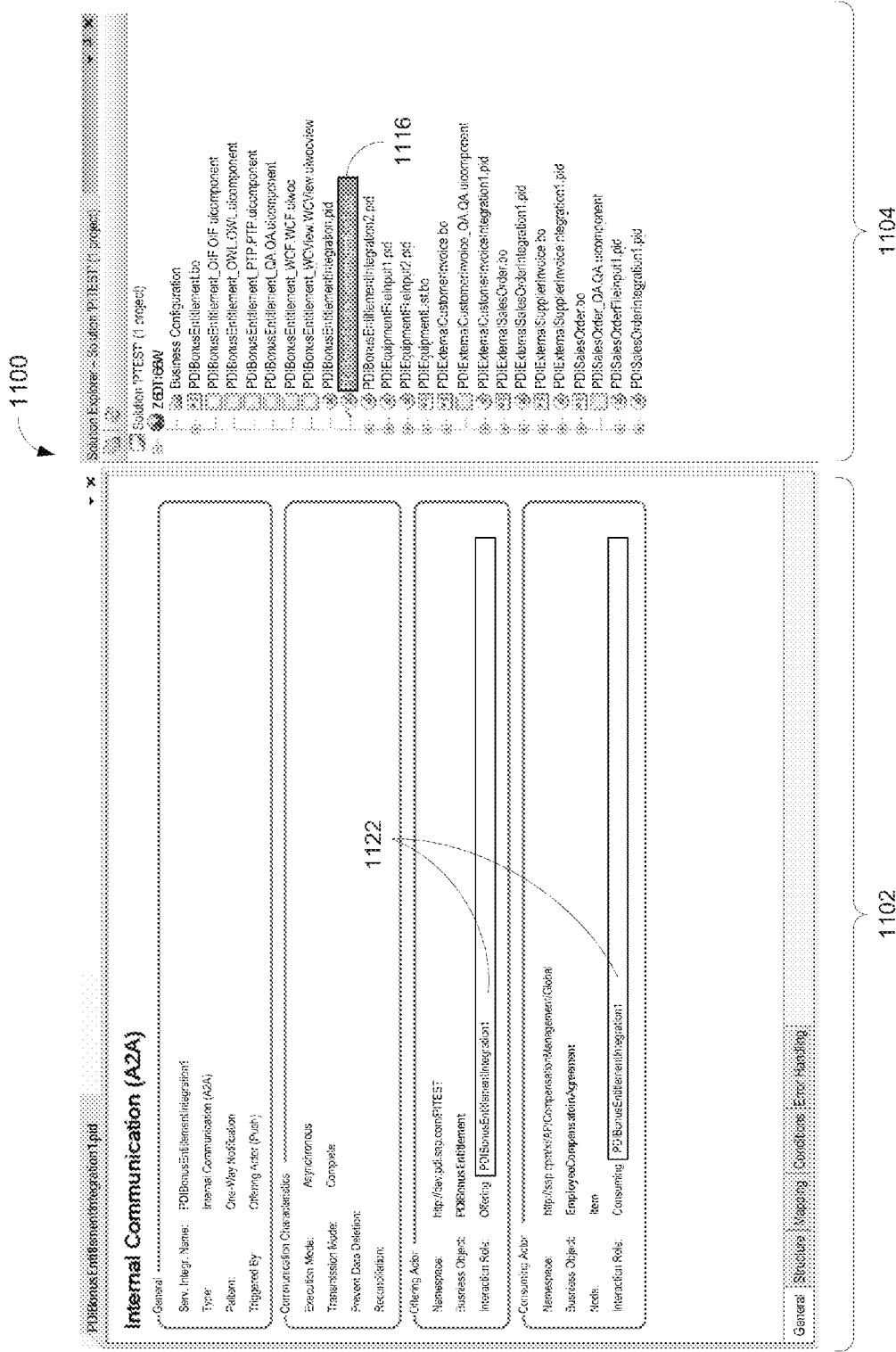
FIG. 19 represents a screenshot of an interface showing the definition of a service integration definition.

FIG. 19 illustrates a screenshot of the interface 1100 shown in FIG. 11, after the service integration has been defined. The Solution Explore area 1104 now lists as another component of the business solution the defined service integration 1116. The display area 1102 shows the details of the defined service integration. In embodiments, some aspects of the service integration definition may be altered. For example, input fields 1122 allow the user to rename the offering interaction role and the consuming interaction role.

Figure 20:
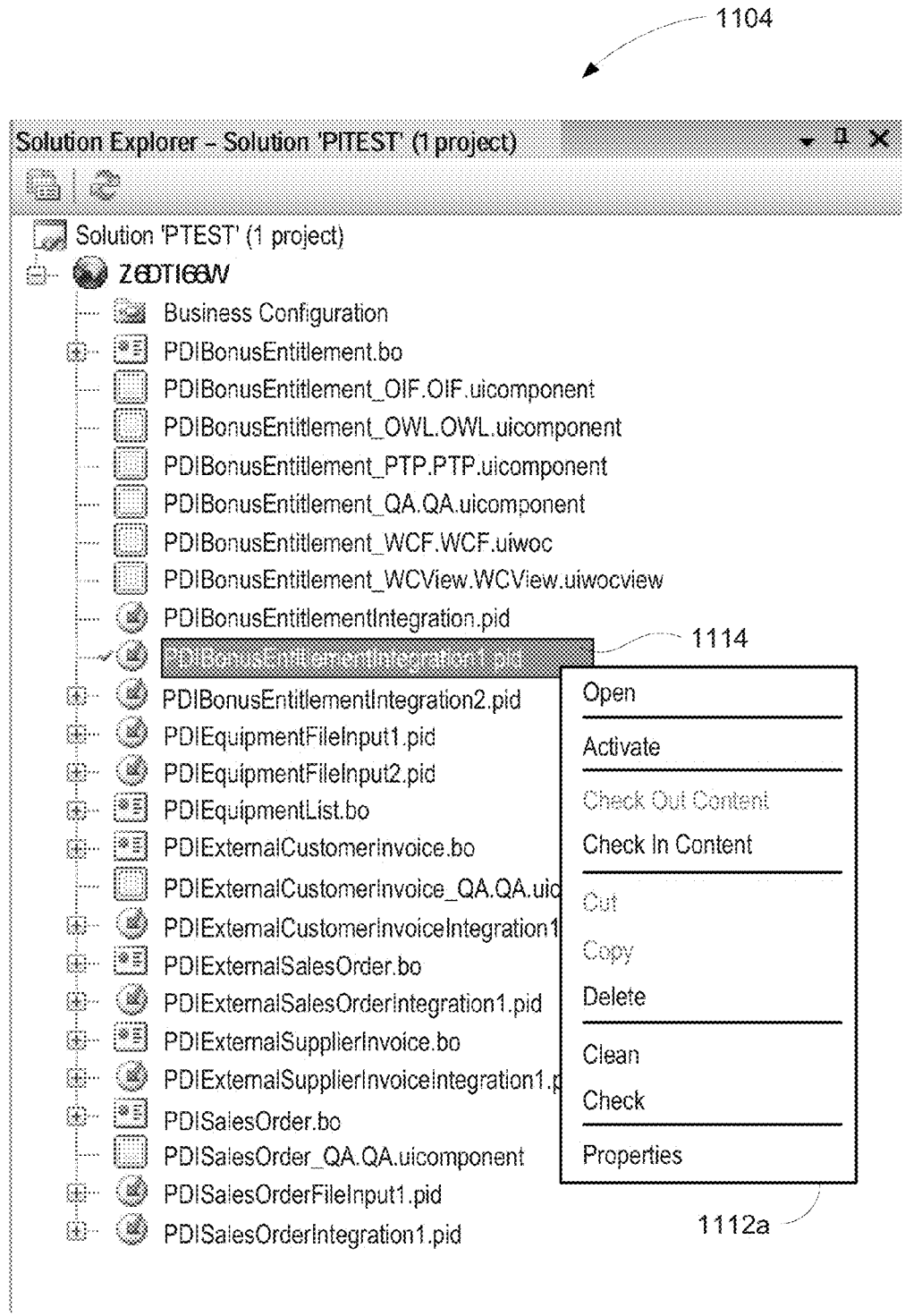
FIG. 20 illustrates various actions that can be performed on a service integration definition.

FIG. 20 illustrates a screenshot of the Solution Explore area 1104 of the interface 1100 shown in FIG. 19. A dropdown context menu 112a for the service integration definition 1114 shows various actions that can be performed. An Activate action will activate the corresponding runtime object of the defined service integration. When the runtime object is activated, it will "listen" for a triggering action from its associated offering actor (business object), and perform in accordance with the processing discussed above. A Delete action will delete the service integration definition. A Clean action will "clean" the service integration runtime object; e.g., place the execution state of the runtime object in an initialized state, delete and intermediate data, and so on. A Check action will check whether the runtime object was correctly activated.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method for exchanging information between a first business object and a second business object comprising:
a computer system receiving information indicative of a selection of the first business object;
the computer system performing one or more actions on the first business object;
the computer system evaluating one or more conditions in response to the one or more actions performed on the first business object;
the computer system assembling a message depending on an outcome of the evaluating, the message comprising data about data elements comprising the first business object and data elements comprising the second business object; and
if a message is assembled, then the computer system sending the message to the second business object,
wherein the assembling includes:
presenting a plurality of first data elements comprising the first business object;
presenting a plurality of second data elements comprising the second business object; and
receiving from a user input that maps one or more of the first data elements with one or more of the second data elements.

2. The method of claim 1 further comprising instantiating a process agent and detecting, by the process agent, a first action among the one or more actions, wherein when the first action is detected by the process agent, then performing the steps of evaluating, assembling, and sending.

3. The method of claim 2 wherein the message is received by a second process agent associated with the second business object.

4. The method of claim 2 wherein the first action is a SAVE operation.

5. The method of claim 1 wherein the second business object is modified using content in the message.

6. The method of claim 1 further comprising operating the computer system to perform steps of:
receiving information from a user indicative of a selection the first business object;
receiving information from the user indicative of a selection of the second business object;
displaying elements of the first business object and of the second business object;
receiving mapping information from the user that specifies a mapping between one or more elements of the first business object and one or more elements of the second business object; and
generating a runtime object based at least on the mapping information.

7. The method of claim 1 wherein the first business object is provided in a first deployment unit and the second business object is provided in a second deployment unit different from the first deployment unit.

8. The method of claim 7 wherein the first deployment unit comprises the computer system.

9. The method of claim 1 wherein the one or more actions include changes to the first business object, wherein the message comprises one or more of the changes to be sent to the second business object.

10. A computer system comprising a processing component and a data store having stored therein computer executable program code configured to be executable by the processing component and configured to cause the processing component to:
receive information indicative of a selection of a first business object;
perform one or more actions on the first business object;
evaluate one or more conditions in response to the one or more actions performed on the first business object;
assemble a message depending on an outcome of the evaluating, the message comprising data about data elements comprising the first business object and data elements comprising the second business object; and
if a message is assembled, then send the message to a second business object,
wherein the assembling includes:
presenting a plurality of first data elements comprising the first business object;
presenting a plurality of second data elements comprising the second business object; and
receiving from a user input that maps one or more of the first data elements with one or more of the second data elements.

11. The computer system of claim 10 wherein the computer executable program code is further configured to cause the processing component to instantiate a process agent and detect, by the process agent, a first action among the one or more actions, wherein when the first action is detected by the process agent, then perform steps to evaluate, assemble, and send.

12. The computer system of claim 10 wherein the computer executable program code is further configured to cause the processing component to:
receive information from a user indicative of a selection the first business object;
receive information from the user indicative of a selection of the second business object;
display elements of the first business object and of the second business object;
receive mapping information from the user that specifies a mapping between one or more elements of the first business object and one or more elements of the second business object; and
generate a runtime object based at least on the mapping information.

13. The computer system of claim 10 wherein the first business object is provided in a first deployment unit and the second business object is provided in a second deployment unit different from the first deployment unit.

14. The computer system of claim 13 wherein the one or more actions include changes to the first business object, wherein the message comprises one or more of the changes to be sent to the second business object.

15. A non-transitory computer-readable storage medium comprising executable program code configured to cause a computer to perform a plurality of steps when executed by the computer, the plurality of steps including:
receiving information indicative of a selection of a first business object;
performing one or more actions on the first business object;
evaluating one or more conditions in response to the one or more actions performed on the first business object;
assembling a message depending on an outcome of the evaluating, the message comprising data about data elements comprising the first business object and data elements comprising the second business object; and
if a message is assembled, then sending the message to a second business object,
wherein the assembling includes:
presenting a plurality of first data elements comprising the first business object;
presenting a plurality of second data elements comprising the second business object; and
receiving from a user input that maps one or more of the first data elements with one or more of the second data elements.

16. The computer-readable storage medium of claim 15 further comprising executable program code configured to cause a computer to perform additional of steps when executed by the computer, the additional steps including instantiating a process agent and detecting, by the process agent, a first action among the one or more actions, wherein when the first action is detected by the process agent, then performing the steps of evaluating, assembling, and sending.

17. The computer-readable storage medium of claim 15 wherein the first business object is provided in a first deployment unit and the second business object is provided in a second deployment unit different from the first deployment unit.

18. The computer-readable storage medium of claim 17 wherein the second business object is modified in accordance with data comprising the message.

\* \* \* \* \*